US012455459B2

(12) United States Patent
Chang (10) Patent No.: US 12,455,459 B2
(45) Date of Patent: Oct. 28, 2025

(54) HEAD-MOUNTED DEVICE AND HEADBAND (71) Applicant: HTC Corporation, Taoyuan (TW)

(72) Inventor: Chih-Yao Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/767,993

(22) Filed: Jul. 10, 2024

(65) Prior Publication Data
US 2025/0076666 A1 Mar. 6, 2025

Related U.S. Application Data (60) Provisional application No. 63/535,080, filed on Aug. 29, 2023.

(51) Int. Cl.
G02B 27/01 (2006.01)

(52) U.S. Cl.
CPC .. *G02B 27/0176* (2013.01); *G02B 2027/0154* (2013.01)

(58) Field of Classification Search
CPC .............. G02B 27/017; G02B 27/0176; G02B 2027/0154
See application file for complete search history.

(56) References Cited

U.S. PATENT DOCUMENTS 11,789,276 B1 * 10/2023 Kasar ................. G02B 27/0176
359/630
2023/0071354 A1 3/2023 Goodner et al.

FOREIGN PATENT DOCUMENTS

| CN | 205750111 | 11/2016 |
| CN | 116449575 | 7/2023 |
| EP | 3740811 | 4/2022 |

OTHER PUBLICATIONS

"Office Action of Taiwan Counterpart Application", issued on Jul. 10, 2025, p. 1-p. 6.

* cited by examiner

Primary Examiner — Cory A Almeida
(74) Attorney, Agent, or Firm — JCIPRNET (57) ABSTRACT A head-mounted device and a headband are disclosed. The head-mounted device includes a host and a headband. The host has two connecting parts located on opposite sides. The headband has two connecting ends located on opposite sides. The connecting ends are detachably and rotatably connected to the connecting part. A first buckle part of each of the connecting ends rotatably buckles a second buckle part of a corresponding one of the connecting parts. When the headband rotates to a detachable position relative to the host, the first buckle part and the second buckle part are separated.

6 Claims, 10 Drawing Sheets

HEAD-MOUNTED DEVICE AND HEADBAND

CROSS-REFERENCE TO RELATED APPLICATION

This application claims the priority benefit of U.S. provisional application Ser. No. 63/535,080, filed on Aug. 29, 2023. The entirety of the above-mentioned patent application is hereby incorporated by reference herein and made a part of this specification.

BACKGROUND

Technical Field

This application relates to a head-mounted device and a headband, and to a head-mounted device and a rotatable headband.

Description of Related Art

In recent years, the use of Virtual Reality (VR) and Augmented Reality (AR) has become more and more popular, and there are many types of head-mounted devices. In the existing head-mounted devices, the headband is mainly used to fix the whole device to the user's head. However, each user's head shape is different, and the position where the headband should touch the head to have a comfortable and stable wearing feeling is also different from person to person. Therefore, it may be an important issue in this field to make the headband securely worn on different user's head and to provide the user with a comfortable wearing feeling.

SUMMARY

This application provides a head-mounted device and a headband with a rotatable headband to meet the different needs of different users.

The head-mounted device of this application includes a host and a headband. The host has two connecting parts located on opposite sides. The headband has two connecting ends located on opposite sides. The connecting ends are detachably and rotatably connected to the connecting parts. A first buckle part of each of the connecting ends is rotatably buckled with a second buckle part of a corresponding one of the connecting parts. When the headband rotates to a detachable position relative to the host, the first buckle parts are separated from the second buckle parts.

The headband of this application is used for a head-mounted device. The head-mounted device includes a host. The host has two connecting parts located on opposite sides. The headband has two connecting ends located on opposite sides. The connecting ends are detachably and rotatably connected to the connecting parts. A first buckle part of each of the connecting ends is rotatably buckled with a second buckle part of a corresponding one of the connecting parts. When the headband rotates to a detachable position relative to the host, the first buckle parts are separated from the second buckle parts.

Based on the above, in the head-mounted device and the headband of this application, the headband is rotatable and detachable relative to the host, which is suitable for users with different head shapes, and the headband can also be replaced according to the usage situation.

DESCRIPTION OF THE EMBODIMENTS

Figure 1:
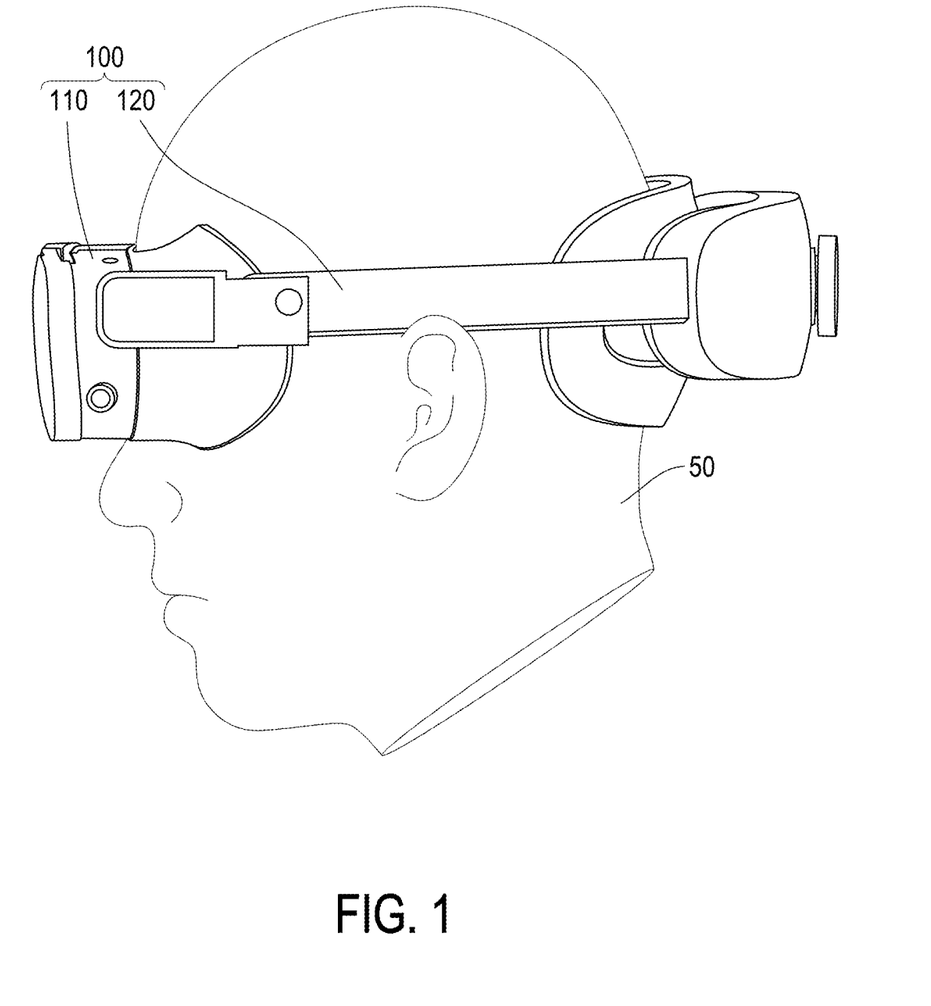
FIG. 1 is a schematic diagram of a scenario in which a head-mounted device of an embodiment of this invention is worn on a head of a user.
Figure 2:
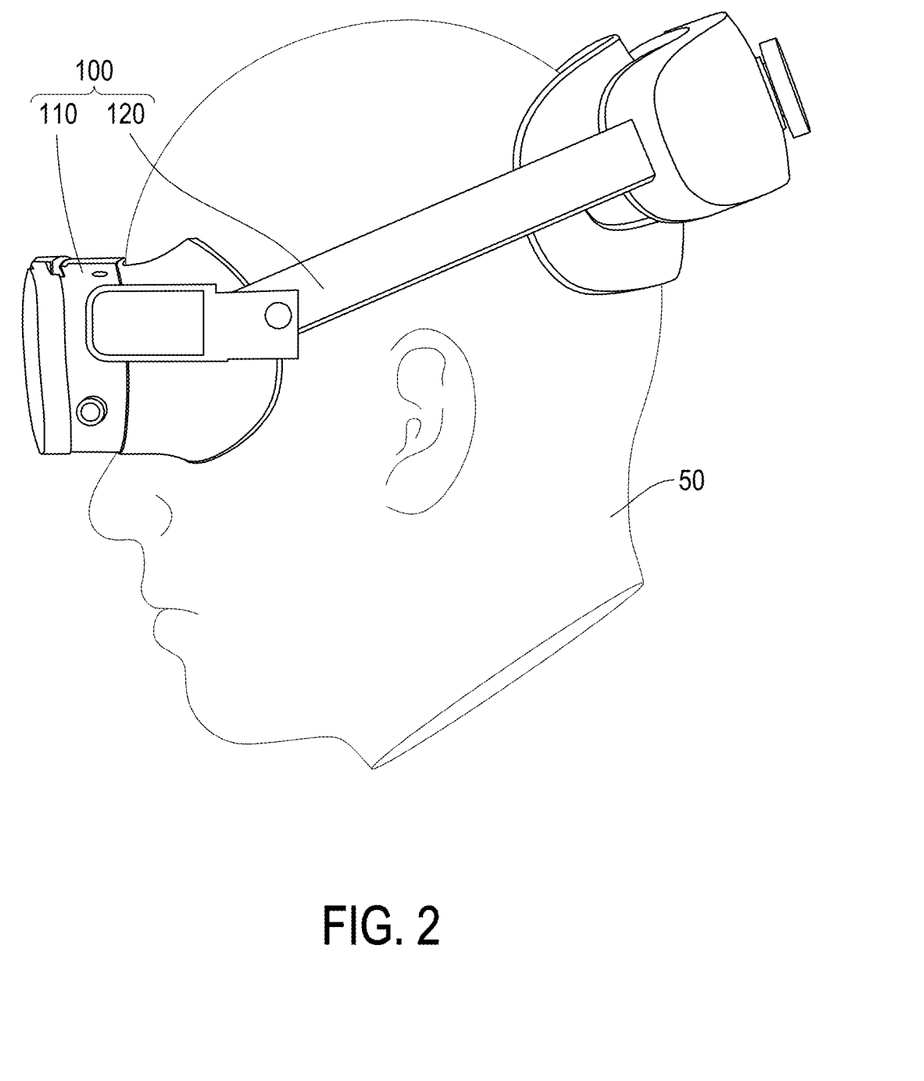
FIG. 2 is a schematic diagram of another scenario in which the head-mounted device of FIG. 1 is worn on a head of a user.

FIG. 1 is a schematic diagram of a scenario in which a head-mounted device of an embodiment of this invention is worn on a head of a user. FIG. 2 is a schematic diagram of another scenario in which the head-mounted device of FIG. 1 is worn on a head of a user. Please refer to FIG. 1 and FIG. 2. A head-mounted device 100 of this embodiment includes a host 110 and a headband 120. The headband 120 is rotatably connected to the host 110. The headband 120 in FIG. 1 is horizontally connected to the host 110, so the headband 120 primarily contacts a direct back portion of the head of a user 50. The headband 120 in FIG. 2 is connected to the host 110 in a tilted position, so that the headband 120 primarily contacts an upper back portion of the head of the user 50. It can be seen from this that when the user 50 wears the head-mounted device 100 of this embodiment, he/she can rotate the headband 120 according to his/her own preferences so that it contacts the back of head at different heights, thus obtaining his/her own most comfortable wearing sensation.

Figure 3A:
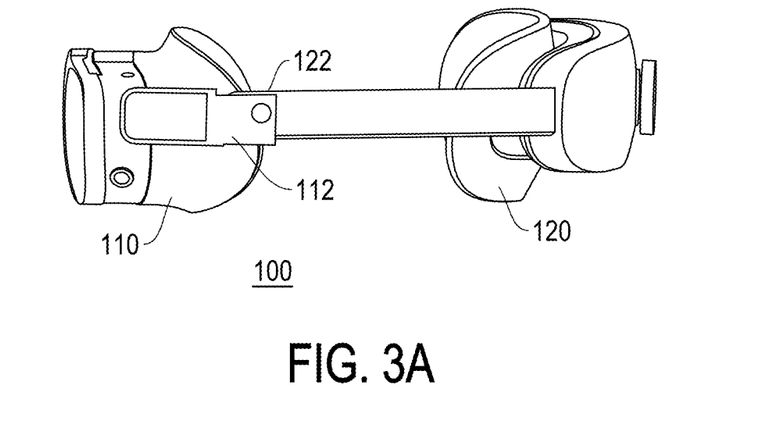
FIG. 3A to FIG. 3D are schematic diagrams of four states of the head-mounted device of FIG. 1.
Figure 3B:
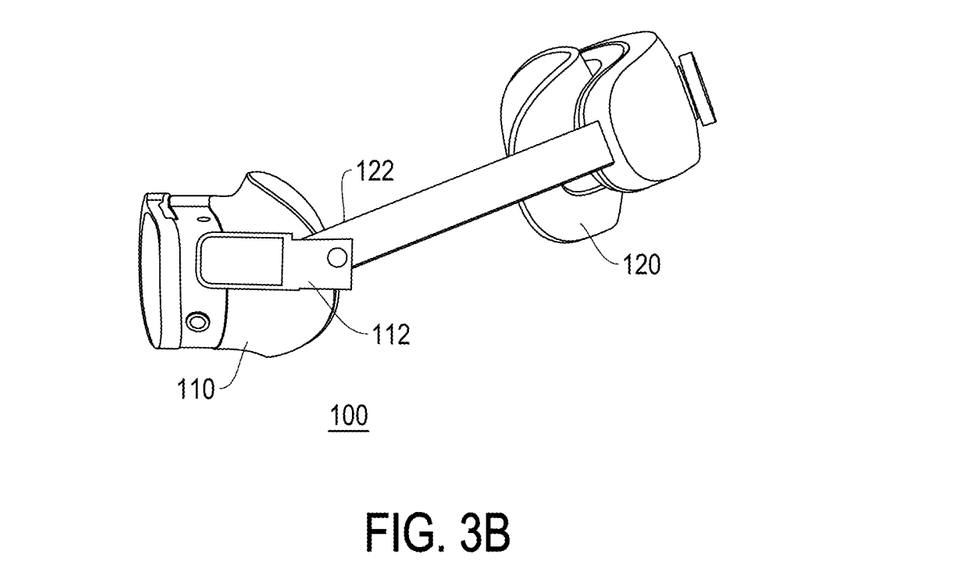

FIG. 3A to FIG. 3D are schematic diagrams of four states of the head-mounted device of FIG. 1. Referring to FIG. 3A, the host 110 has two connecting parts 112 located on opposite sides. The headband 120 has two connecting ends 122 located on opposite sides. Due to the perspective of FIG. 3A to FIG. 3D, only one connecting part 112 and one connecting end 122 can be seen, but those skilled in the art can easily understand the specific positions of the two connecting parts 112 and the two connecting ends 122. Each of the connecting ends 122 is detachably and rotatably connected to the connecting part 112. Please refer to FIG. 3B. Because the connecting end 122 is rotatably connected to the connecting part 112, the headband 120 can be rotated to a tilted position relative to the host 110. Please refer to FIG. 3C. The headband 120 can continue to rotate relative to the host 110 to a nearly vertical position, which is a detachable position. Please refer to FIG. 3D. When the headband 120 is rotated to a nearly vertical detachable position relative to the host 110, the headband 120 can be detached from the host 110 because the connecting end 122 is detachably connected to the connecting part 112. Thus, the headband 120 can be applied to different hosts 110 according to needs, and different headbands can also be used to match the original host, so that the head-mounted device 100 can be suitable for a variety of different usage scenarios.

Figure 3C:
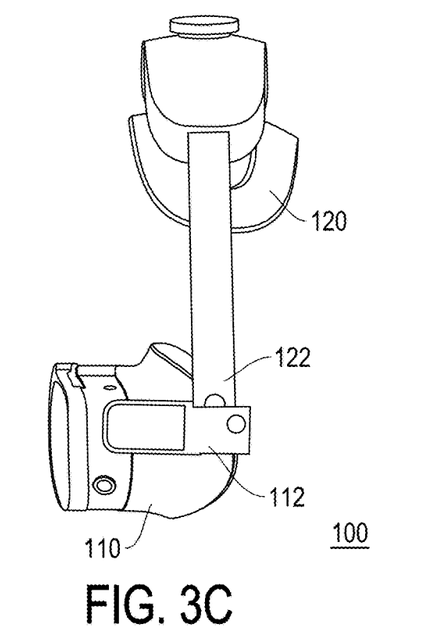
Figure 3D:
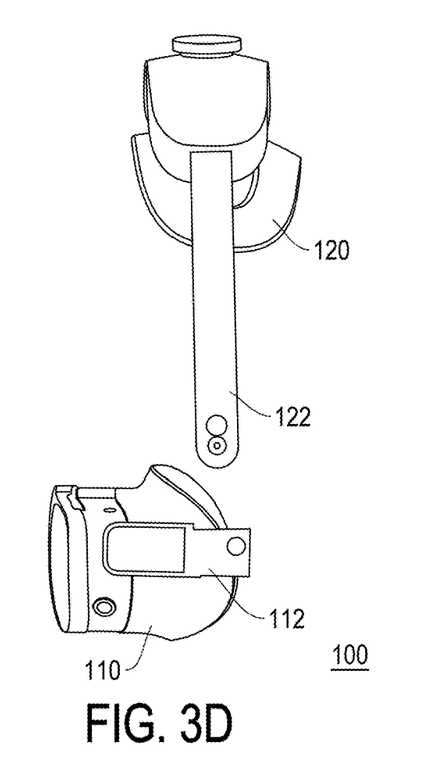
Figure 4:
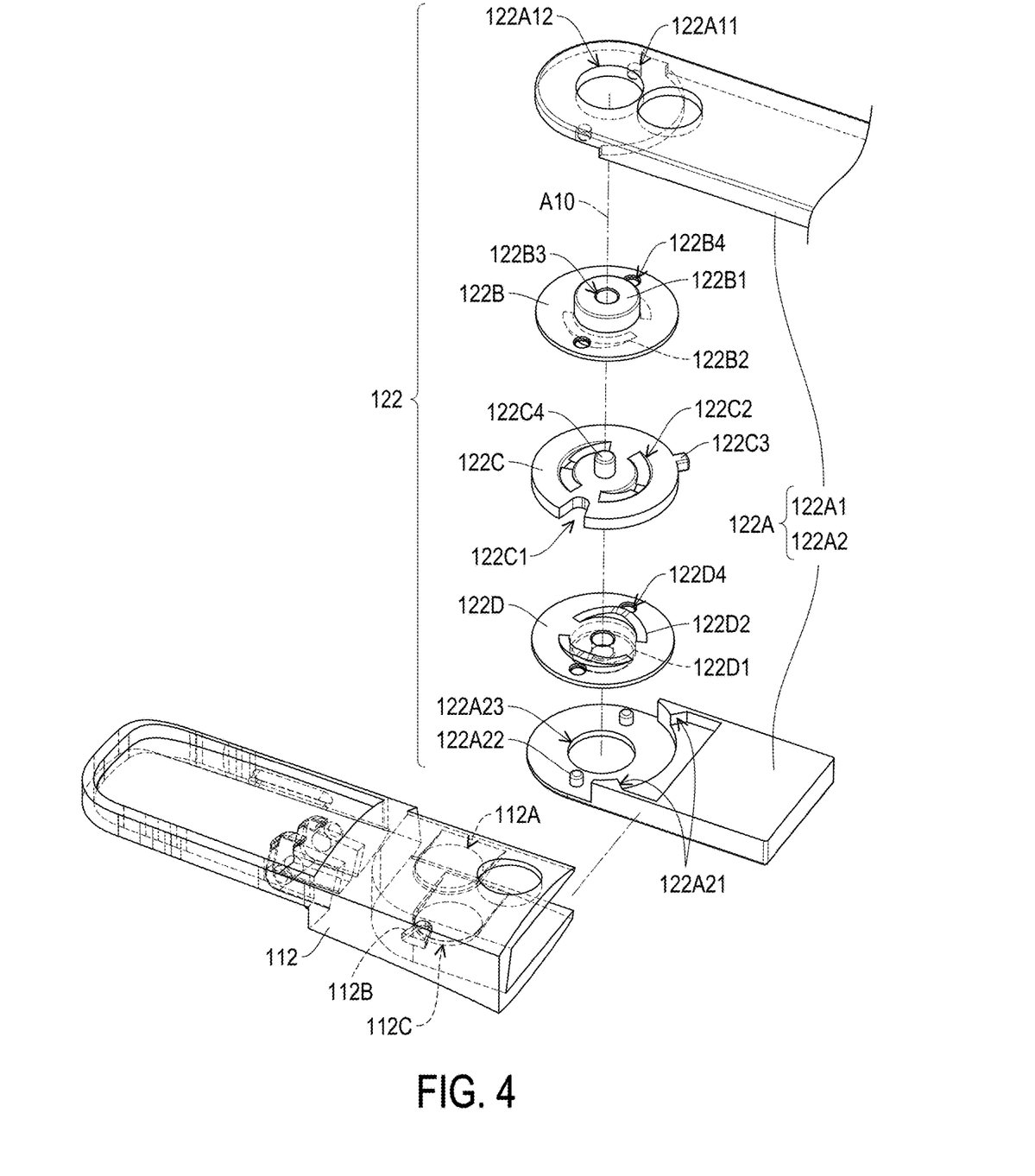
FIG. 4 is a schematic diagram of a disassembly state at a connection between a host and a headband of the head-mounted device of FIG. 1.
Figure 5:
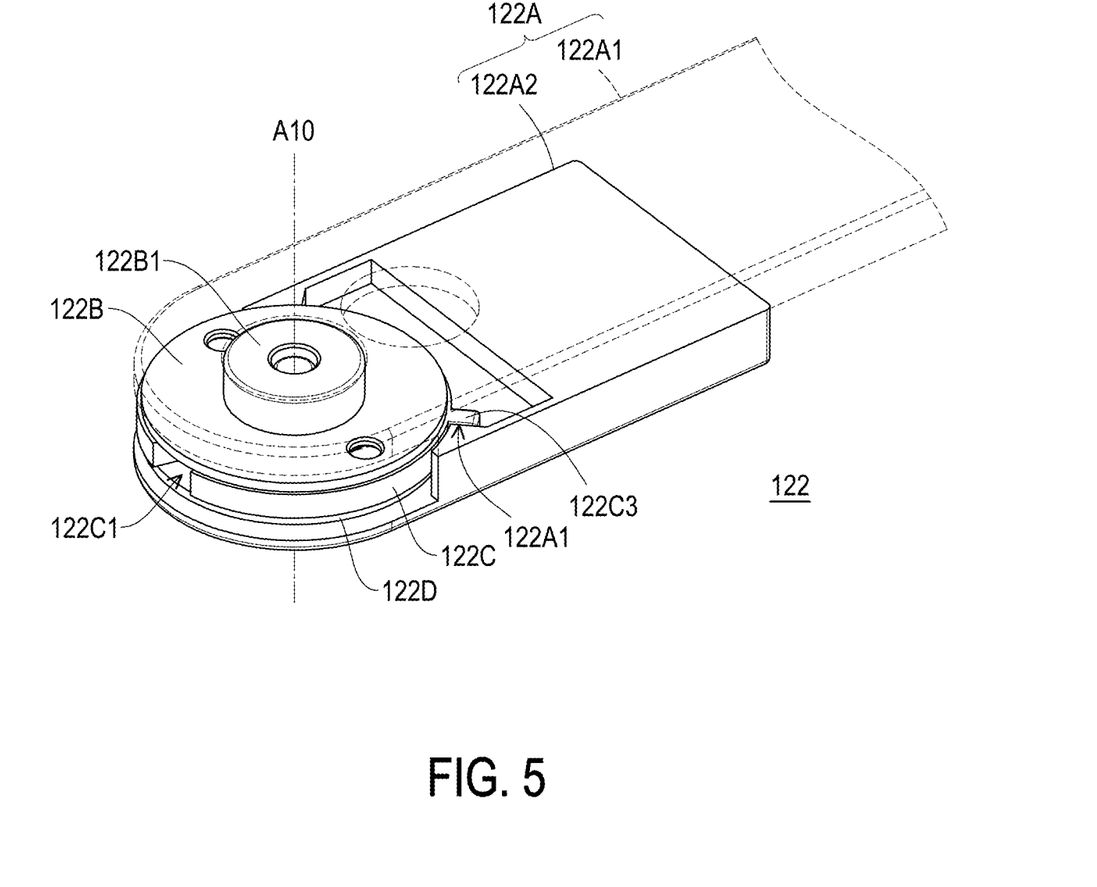
FIG. 5 is a schematic diagram of a connecting end of the headband of the head-mounted device of FIG. 1.

FIG. 4 is a schematic diagram of a disassembly state at a connection between a host and a headband of the head-mounted device of FIG. 1. FIG. 5 is a schematic diagram of a connecting end of the headband of the head-mounted device of FIG. 1. Please refer to FIG. 4 and FIG. 5. A first buckle part 122B1 of the each of the connecting ends 122 rotatably buckles a second buckle part 112A of the corresponding connecting part 112. In FIG. 3C, when the headband 120 rotates to the detachable position relative to the host 110, the first buckle part 122B1 is separated from the second buckle part 112A, so that the connecting end 122 can be detached from the connecting part 112.

According to the above, in the head-mounted device 100 of this embodiment, not only the headband 120 is rotatable, but also the headband 120 can be detached from the host 110 when it is rotated to a detachable position relative to the host 110. Thus, each user can rotate the headband 120 according to his or her own preference, so that the headband 120 is in the position that he/she finds most comfortable. Moreover, the headband 120 can be detached directly by rotating the headband 120 to the detachable position without additional manipulation. The headband 120 may also have a back head pad 126 that contacts the back of head of the user to provide support and increase wearing comfort.

Please refer to FIG. 4 and FIG. 5. In this embodiment, the each of the connecting ends 122 includes a housing 122A, a first buckle member 122B, and a turntable 122C. The first buckle member 122B is disposed in the housing 122A. The first buckle member 122B is used to move relative to the housing 122A in an axial direction A10. In FIG. 5, the first buckle part 122B1 of the first buckle member 122B is in a state of being retracted into the housing 122A. Thus, the connecting end 122 in the state of FIG. 5 can be placed into the connecting part 112 of FIG. 4. Currently, the first buckle part 122B1 is retracted into the housing 122A, so it does not interfere with the second buckle part 112A of the connecting part 112, and the two are separated.

On the other hand, the first buckle part 122B1 of the first buckle member 122B can also protrude from the housing 122A. At this time, if the connecting end 122 has been placed in the connecting part 112, the first buckle part 122B1 protruding from the housing 122A buckles the second buckle part 112A of the corresponding connecting part 112, so that the connecting end 122 is connected to the connecting part 112 and cannot be separated.

The turntable 122C is rotatably connected to the first buckle member 122B. For example, a rotating shaft 122C4 of the turntable 122C can be inserted into a shaft hole 122B3 of the first buckle member 122B, but the turntable 122C and the first buckle member 122B can also be rotatably connected to each other using other mechanisms. The first buckle member 122B is used to move relative to the turntable 122C in the axial direction A10. That is, the first buckle member 122B can be away from or close to the turntable 122C in the axial direction A10, and the rotating shaft 122C4 and the shaft hole 122B3 cooperate to limit the movement of the first buckle member 122B in the axial direction A10. A third buckle part 122C1 of the turntable 122C is used to buckle a fourth buckle part 112B of the corresponding connecting part 112. Thus, when the connecting end 122 has been placed in the connecting part 112, the fourth buckle part 112B makes the turntable 122C unable to rotate relative to the connecting part 112, but the turntable 122C can rotate relative to other components of the connecting end 122.

Figure 6A:
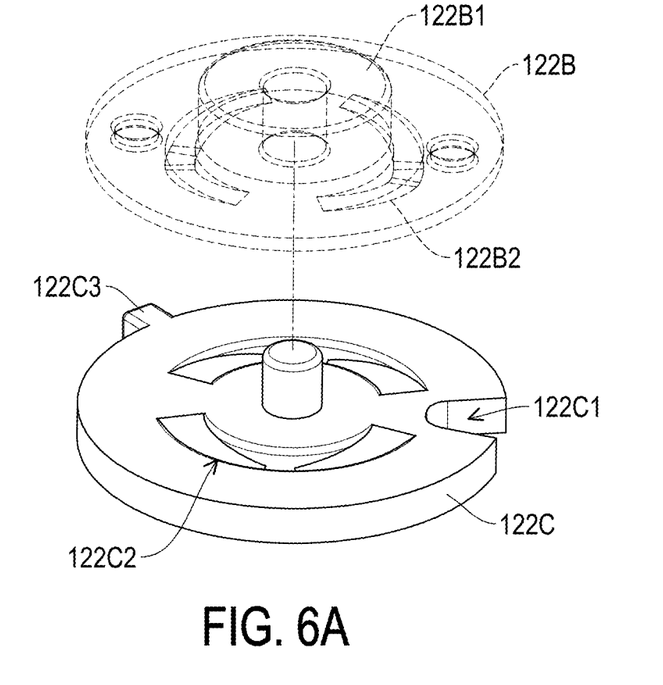
FIG. 6A and FIG. 6B are schematic diagrams of two states of a buckle member and a turntable of the connecting end of the headband of the head-mounted device of FIG. 1.
Figure 6B:
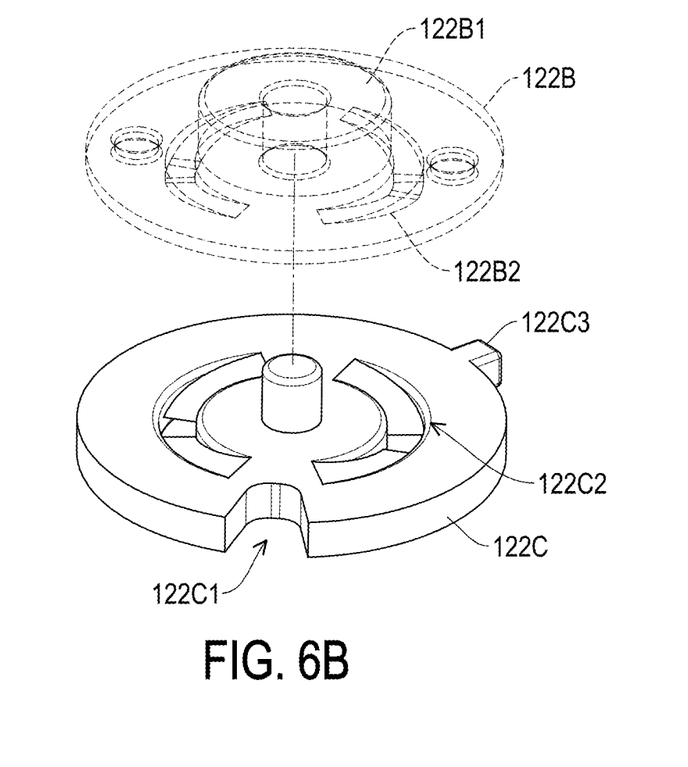
Figure 7A:
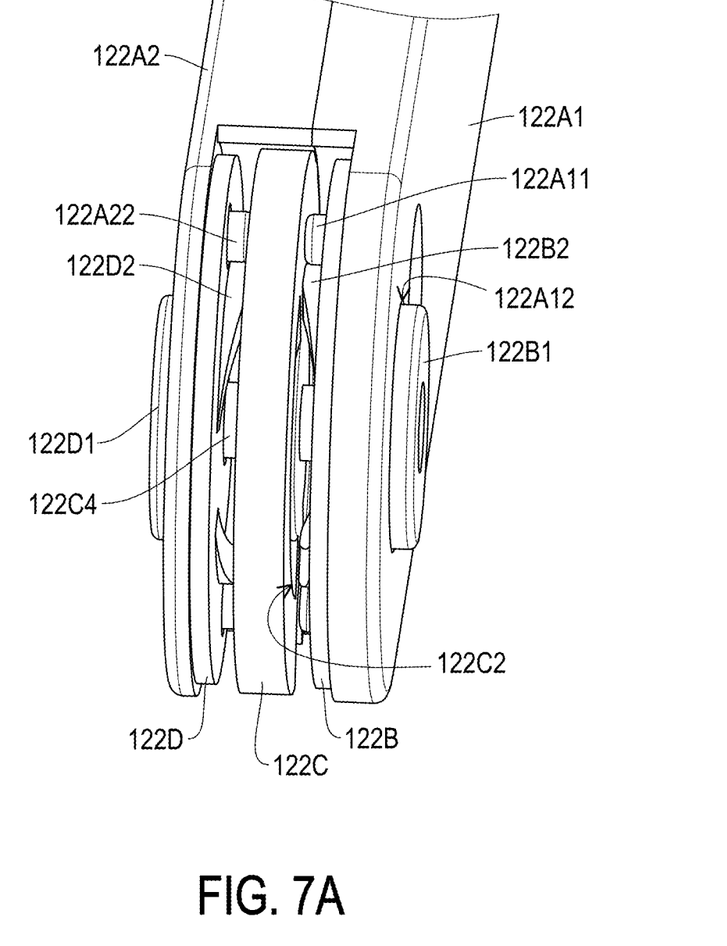
FIG. 7A and FIG. 7B are schematic diagrams of the connecting end of the headband of the head-mounted device of FIG. 1 corresponding to the two states of FIG. 6A and FIG. 6B, respectively.
Figure 7B:
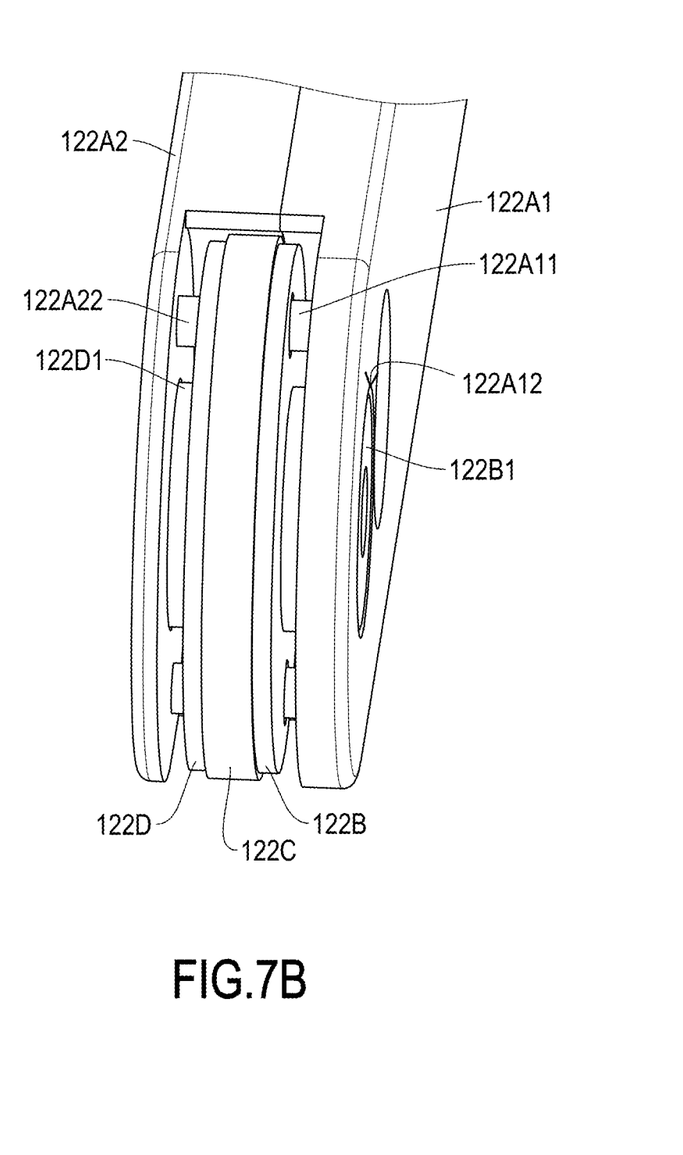

FIG. 6A and FIG. 6B are schematic diagrams of two states of a buckle member and a turntable of the connecting end of the headband of the head-mounted device of FIG. 1. FIG. 7A and FIG. 7B are schematic diagrams of the connecting end of the headband of the head-mounted device of FIG. 1 corresponding to the two states of FIG. 6A and FIG. 6B, respectively. Please refer to FIG. 3A, FIG. 6A, and FIG. 7A. In this embodiment, a surface of the turntable 122C facing the first buckle member 122B has an arc-shaped groove 122C2. A surface of the first buckle member 122B facing the turntable 122C has an arc-shaped protruding rib 122B2. In FIG. 3A, when the headband 120 leaves the detachable position relative to the host 110, the arc-shaped protruding rib 122B2 keeps the turntable 122C away from the first buckle member 122B, and the first buckle part 122B1 protrudes from the housing 122A, which is the state of FIG. 6A and FIG. 7A. Specifically, in the states of FIG. 6A and FIG. 7A, because the position of the arc-shaped protruding rib 122B2 does not completely correspond to the arc-shaped groove 122C2, the arc-shaped protruding rib 122B2 cannot be placed in the arc-shaped groove 122C2, and a distance is created between the turntable 122C and the first buckle member 122B to accommodate the arc-shaped protruding rib 122B2. In other words, the first buckle part 122B1 of the first buckle member 122B also protrude upward. At this time, the first buckle part 122B1 protrudes from the housing 122A and can buckle the second buckle part 112A.

Please refer to FIG. 3C, FIG. 6B, and FIG. 7B. In FIG. 3C, when the headband 120 rotates to the detachable position relative to the host 110, the arc-shaped protruding rib 122B2 slides into the arc-shaped groove 122C2, and the first buckle part 122B1 retracts into the housing 122A, which is the state of FIG. 6B and FIG. 7B. Specifically, in the states of FIG. 6B and FIG. 7B, because the position of the arc-shaped protruding rib 122B2 completely corresponds to the arc-shaped groove 122C2, the arc-shaped protruding rib 122B2 is placed in the arc-shaped groove 122C2, and the turntable 122C can be completely attached to the first buckle member 122B. In other words, the first buckle part 122B1 of the first buckle member 122B also retracts downward. At this time, the first buckle part 122B1 is retracted into the housing 122A and separated from the second buckle part 112A, so that the connecting end 122 can be detached from the connecting part 112.

Figure 8:
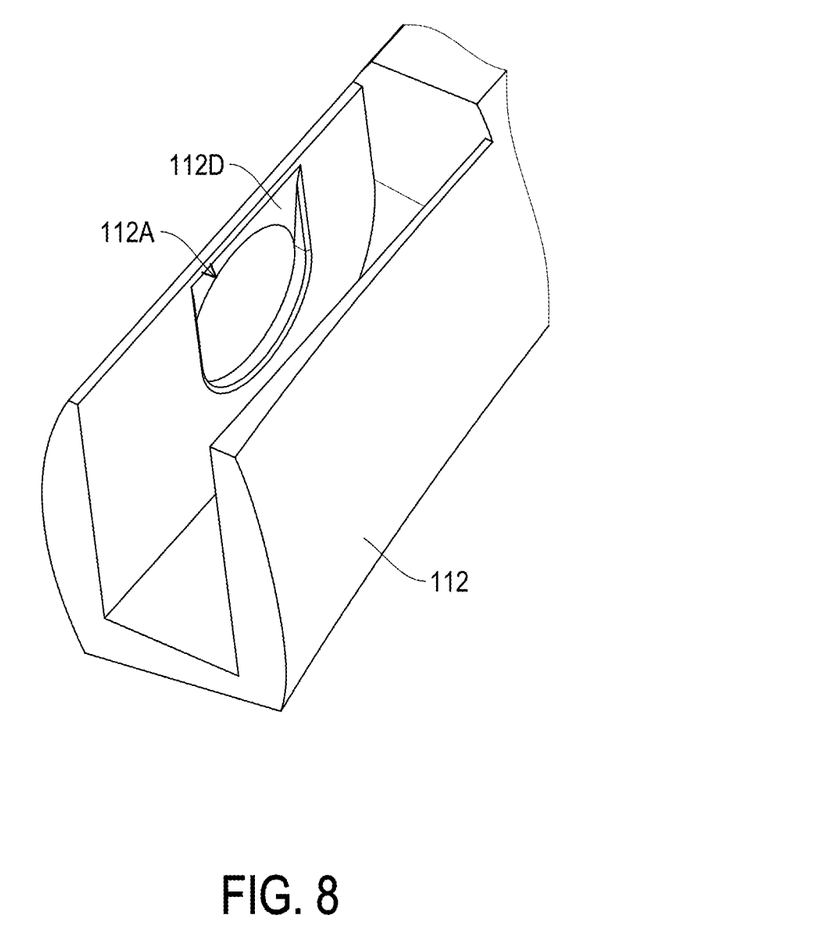
FIG. 8 is a schematic diagram of a connecting part of the host of the head-mounted device of FIG. 1.

FIG. 8 is a schematic diagram of a connecting part of the host of the head-mounted device of FIG. 1. Please refer to FIG. 3C, FIG. 6B, and FIG. 8. At this time, although the positions of the arc-shaped groove 122C2 of the turntable 122C and the arc-shaped protruding rib 122B2 of the first buckle member 122B correspond to each other, it still requires an external force to be exerted to the first buckle member 122B in order to make it lean against the turntable 122C. During the process of detaching the connecting end 122 from the connecting part 112, a tilted surface 112D adjacent to the second buckle part 112A exerts a thrust on the first buckle part 122B1. Since the arc-shaped protruding rib 122B2 can be placed in the arc-shaped groove 122C2, the arc-shaped protruding rib 122B2 does not obstruct the first buckle member 122B from leaning against the turntable 122C, and the connecting end 122 can also be detached from the connecting part 112 smoothly.

In this embodiment, the height of the arc-shaped protruding rib 122B2 is designed to gradually increase from both ends toward the middle, and the depth of the arc-shaped groove 122C2 is correspondingly designed to gradually become deeper from both ends toward the middle. Thus, when the turntable 122C and the first buckle member 122B rotate relative to each other, the distance between the turntable 122C and the first buckle member 122B gradually increases or decreases to avoid the feeling of jamming. Of course, the height of the arc-shaped protruding rib 122B2 and the depth of the arc-shaped groove 122C2 can also be designed in other ways to obtain the desired operating experience.

Please refer to FIG. 4 and FIG. 5. In this embodiment, the each of the connecting ends 122 may further include a second buckle member 122D. The second buckle member 122D is disposed in the housing 122A. The second buckle member 122D is used to move relative to the housing 122A in the axial direction A10. A fifth buckle part 122D1 of the second buckle member 122D is used to protrude from the housing 122A and buckle a sixth buckle part 112C of the corresponding connecting part 112. The fifth buckle part 122D1 of the second buckle member 122D is also used to retract into the housing 122A and separate from the sixth buckle part 112C. The turntable 122C is rotatably connected to the second buckle member 122D and is located between the first buckle member 122B and the second buckle member 122D. When the turntable 122C rotates relative to the connecting end 122, the first buckle member 122B and the second buckle member 122D move in opposite directions relative to the turntable 122C in the axial direction A10. That is, the second buckle member 122D is basically the same as the first buckle member 122B, and the two are symmetrical to each other with the turntable 122C as the center.

When the headband 120 rotates from the detachable position to other positions relative to the host 110, both the first buckle member 122B and the second buckle member 122D gradually move away from the turntable 122C, and both the first buckle part 122B1 and the fifth buckle part 122D1 gradually protrude from the housing 122A, and the second buckle part 112A and the sixth buckle part 112C are buckled, so that the headband 120 is firmly connected to the host 110 and will not be detached from the host 110.

When the headband 120 rotates from other positions to the detachable position relative to the host 110, both the first buckle member 122B and the second buckle member 122D gradually approach the turntable 122C, and the first buckle part 122B1 and the fifth buckle part 122D1 gradually retract into the housing 122A and detached from the second buckle part 112A and the sixth buckle part 112C, so that the headband 120 can be detached from the host 110.

In addition, a surface of the turntable 122C facing the second buckle member 122D has an arc-shaped groove 122C2. A surface of the second buckle member 122D facing the turntable 122C has an arc-shaped protruding rib 122D2. When the headband 120 rotates to the detachable position relative to the host 110, the arc-shaped protruding rib 122D2 slides into the arc-shaped groove 122C2, and the first buckle part 122D1 of the second buckle member 122D retracts into the housing 122A. When the headband 120 leaves the detachable position relative to the host 110, the arc-shaped protruding rib 122D2 keep the turntable 122C away from the second buckle member 122D and the first buckle part 122D1 protrudes from the housing 122A.

In this embodiment, the turntable 122C has a protruding point 122C3, and the corresponding housing 122A has a limiting portion 122A21. The protruding point 122C and the limiting portion 122A21 cooperate to limit a rotation angle of the turntable 122C relative to the connecting end 122. For example, the limiting portion 122A21 includes two supporting surfaces corresponding to two positions of the circumference of the turntable 122C. When the turntable 122C rotates relative to the housing 122A, the protruding point 122C can move between the two supporting surfaces. However, when the protruding point 122C contacts the supporting surface of the limiting portion 122A21, the turntable 122C cannot continue to rotate in the same direction relative to the housing 122A. Thus, appropriate support can be provided at a specific angle between the host 110 and the headband 120.

In this embodiment, the housing 122A is divided into a first housing 122A1 and a second housing 122A2, for example, to facilitate assembly. The turntable 122C is disposed between the first housing 122A1 and the second housing 122A2, the first buckle member 122B is disposed between the first housing 122A1 and the turntable 122C, and the second buckle member 122D is disposed between the second housing 122A2 and the turntable 122C. The first housing 122A1 has, for example, a positioning pin 122A11 and an opening 122A12. For example, the first buckle member 122B has a positioning hole 122B4 for the positioning pin 122A11 to be inserted, so that the first buckle member 122B cannot rotate relative to the first housing 122A1. The first buckle part 122B1 is adapted to pass through the opening 122A12 and protrude outside the first housing 122A1. The second housing 122A2 has, for example, a positioning pin 122A22 and an opening 122A23. The second buckle member 122D has, for example, a positioning hole 122D4 for the positioning pin 122A22 to be inserted, so that the second buckle member 122D cannot rotate relative to the second housing 122A2. The fifth buckle part 122D1 is adapted to pass through the opening 122A23 and protrude out of the second housing 122A2.

The host 110 in this embodiment is a head-mounted display, which can be applied to fields such as virtual reality systems, augmented reality systems, or mixed reality systems. The host 110 may include components such as an optical system and a protective housing, and may be provided with or adapted to place a display. The display may be a built-in display or an external portable display (such as a smart phone), but the application is not limited thereto. The optical system includes optical elements used to change the light path of the display, such as lenses, light guides, or prisms. The host 110 in FIG. 1 is presented in a slightly larger form, but the host 110 can also be in a lighter form or other forms.

To sum up, in the head-mounted device and headband of this application, the headband can rotate relative to the host, which is suitable for users to adjust the position of the headband according to their own preferences. Moreover, because the headband can be detached from the host, users can replace the headband or the host according to the usage situation.

What is claimed is:

1. A head-mounted device, comprising:
   a host, having two connecting parts located on opposite sides; and
   a headband, having two connecting ends located on opposite sides, wherein the connecting ends are detachably and rotatably connected to the connecting parts, a first buckle part of each of the connecting ends is rotatably buckled with a second buckle part of a corresponding one of the connecting parts, and when the headband rotates to a detachable position relative to the host, the first buckle parts are separated from the second buckle parts,
   wherein the each of the connecting ends comprises a housing, a first buckle member, and a turntable, the first buckle member is disposed in the housing, the first buckle member is configured to move relative to the housing in an axial direction, the first buckle part of the first buckle member is configured to protrude from the housing and buckle the corresponding second buckle part, the first buckle part of the first buckle member is also configured to retract into the housing and separate from the corresponding second buckle part, the turntable is rotatably connected to the first buckle member, the first buckle member is configured to move relative to the turntable in the axial direction, and a third buckle part of the turntable is configured to buckle a fourth buckle part of the corresponding one of the connecting parts, such that the turntable cannot rotate relative to the connecting part, wherein a surface of the turntable facing the first buckle member has an arc-shaped groove, a surface of the first buckle member facing the turntable has an arc-shaped protruding rib, when the headband rotates to the detachable position relative to the host, the arc-shaped protruding rib slides into the arc-shaped groove and the first buckle part retracts into the housing, and when the headband leaves the detachable position relative to the host, the arc-shaped protruding rib keeps the turntable away from the first buckle member, such that the first buckle part protrudes from the housing.

2. The head-mounted device according to claim 1, wherein the each of the connecting ends further comprises a second buckle member, the second buckle member is disposed in the housing, the second buckle member is configured to move relative to the housing in the axial direction, a fifth buckle part of the second buckle member is configured to protrude from the housing and buckle a sixth buckle part of the corresponding one of the connecting parts, the fifth buckle part of the second buckle member is also configured to retract into the housing and separate from the sixth buckle part, the turntable is rotatably connected to the second buckle member and is located between the first buckle member and the second buckle member, and when the turntable rotates relative to the connecting end, the first buckle member and the second buckle member move in opposite directions relative to the turntable in the axial direction.

3. The head-mounted device according to claim 1, wherein the turntable has a protruding point, the corresponding housing has a limiting portion, and the protruding point and the limiting portion cooperate to limit a rotation angle of the turntable relative to the connecting end.

4. A headband for a head-mounted device, wherein the head-mounted device comprises a host having two connecting parts located on opposite sides, the headband has two connecting ends located on opposite sides, wherein the connecting ends are detachably and rotatably connected to the connecting parts, a first buckle part of each of the connecting ends is rotatably buckled with a second buckle part of a corresponding one of the connecting parts, and when the headband rotates to a detachable position relative to the host, the first buckle parts are separated from the second buckle parts, wherein the each of the connecting ends comprises a housing, a first buckle member, and a turntable, the first buckle member is disposed in the housing, the first buckle member is configured to move relative to the housing in an axial direction, the first buckle part of the first buckle member is configured to protrude from the housing and buckle the corresponding second buckle part, the first buckle part of the first buckle member is also configured to retract into the housing and separate from the corresponding second buckle part, the turntable is rotatably connected to the first buckle member, the first buckle member is configured to move relative to the turntable in the axial direction, and a third buckle part of the turntable is configured to buckle a fourth buckle part of the corresponding one of the connecting parts, such that the turntable cannot rotate relative to the connecting part, wherein a surface of the turntable facing the first buckle member has an arc-shaped groove, a surface of the first buckle member facing the turntable has an arc-shaped protruding rib, when the headband rotates to the detachable position relative to the host, the arc-shaped protruding rib slides into the arc-shaped groove and the first buckle part retracts into the housing, and when the headband leaves the detachable position relative to the host, the arc-shaped protruding rib keeps the turntable away from the first buckle member, such that the first buckle part protrudes from the housing.

5. The headband according to claim 4, wherein the each of the connecting ends further comprises a second buckle member, the second buckle member is disposed in the housing, the second buckle member is configured to move relative to the housing in the axial direction, a fifth buckle part of the second buckle member is configured to protrude from the housing and buckle a sixth buckle part of the corresponding one of the connecting parts, the fifth buckle part of the second buckle member is also configured to retract into the housing and separate from the sixth buckle part, the turntable is rotatably connected to the second buckle member and is located between the first buckle member and the second buckle member, and when the turntable rotates relative to the connecting end, the first buckle member and the second buckle member move in opposite directions relative to the turntable in the axial direction.

6. The headband according to claim 4, wherein the turntable has a protruding point, the corresponding one of the connecting parts has a limiting portion, and the protruding point and the limiting portion cooperate to limit a rotation angle of the turntable relative to the connecting end.

* * * * *